UNITED STATES PATENT OFFICE.

CYRUS S. WELLER, OF WATERBURY, CONNECTICUT.

PAPER-HANGER'S SIZE.

SPECIFICATION forming part of Letters Patent No. 567,556, dated September 8, 1896.

Application filed May 20, 1896. Serial No. 592,343. (No specimens.)

*To all whom it may concern:*

Be it known that I, CYRUS S. WELLER, a citizen of the United States, residing at Waterbury, in the county of New Haven and State of Connecticut, have invented a new and useful Improvement in Sizing Compounds, of which the following is a clear and exact description, sufficient to enable others skilled in the art to which it appertains to make and use the same.

Sizings as hitherto made have had a syrup-like consistency, which is undesirable for various reasons, and the object of my invention is to provide a "paper-hanger's size" having a jelly-like consistency which is not affected by exposure to the atmosphere and possesses all of the requisite qualifications for preparing painted, whitewashed, calcimined, or wood surfaces. I attain this object by combining the following substances in the proportions stated, viz: Glue, one hundred pounds; sugar, four hundred pounds; carbonate of potash, one pound dissolved in water; oil of citronella, one-half pound. These ingredients are boiled together with about seventy-five gallons of water until a homogeneous mass is formed and the excess of water is evaporated. It is then strained and poured into suitable molds, where it is allowed to repose until jellied. It may then be turned out into other receptacles, or sealed in the original molds.

Glue and sugar alone in the proportions given above may be jellied, but the jelly is unstable and is liable to sour and decay if exposed to the atmosphere. By adding the carbonate of potash in the proportion given decomposition is very much retarded, if not altogether prevented.

I use the oil of citronella as a perfume for the glue and also to modify any odor arising from decomposition should that occur.

This composition is intended to form an article of trade, and when used is to be dissolved in hot water in about the proportion of one gallon of jelly to three gallons of water. It is then applied to the wall prior to putting on the paper with the usual paste.

I am aware that sizing compounds containing glue and sugar have been used, but always in combination with some other substance, as alcohol or molasses, forming a syrupy mass; but I am not aware that all of the ingredients of my composition have been used, and in the proportions necessary, with the express purpose of obtaining a jelly-like mass, which is a distinct and superior form, as it does not adhere to the containing dish and does not form a skin on the surface when exposed to the air.

Having thus described my invention, I claim as new and desire to secure by Letters Patent of the United States—

The herein-described composition of matter for "paper-hanger's size," consisting of water, glue, sugar, carbonate of potash and oil of citronella, in the proportions and manner specified to form a jelly.

CYRUS S. WELLER.

Witnesses:
 FRANK P. BRETT,
 GEO. B. OATMAN.